United States Patent [19]

Thylén

[11] Patent Number: 5,140,657
[45] Date of Patent: Aug. 18, 1992

[54] DIFFRACTION OPTICAL COUPLER

[75] Inventor: Lars H. Thylén, Huddinge, Sweden

[73] Assignee: Telefonaktiebolaget L M Ericsson, Stockholm, Sweden

[21] Appl. No.: 603,237

[22] Filed: Oct. 25, 1990

[30] Foreign Application Priority Data

Oct. 27, 1989 [SE] Sweden ......................... 8903602

[51] Int. Cl.$^5$ ............................................. G02B 6/34
[52] U.S. Cl. ....................................................... 385/37
[58] Field of Search ............... 350/96.15, 96.16, 96.18, 350/96.19, 96.2, 3.6; 358/15, 37, 88; 359/1, 15

[56] References Cited

U.S. PATENT DOCUMENTS

| | | | |
|---|---|---|---|
| 3,666,345 | 5/1972 | Maslowski | 350/3.61 |
| 3,809,455 | 5/1974 | Pekau et al. | 350/96.18 |
| 4,432,600 | 2/1984 | Falco | 350/96.18 |
| 4,708,426 | 11/1987 | Khoe | 350/96.18 |
| 4,834,485 | 5/1989 | Lee | 350/96.19 |
| 4,886,334 | 12/1989 | Aoki | 350/96.15 |
| 4,952,017 | 8/1990 | Henry | 350/96.15 |
| 4,995,696 | 2/1991 | Nishimura et al. | 350/96.2 |

FOREIGN PATENT DOCUMENTS 0114439 8/1984 European Pat. Off.
0275947 5/1989 European Pat. Off.

Primary Examiner—John D. Lee
Assistant Examiner—John Ngo
Attorney, Agent, or Firm—Burns, Doane, Swecker & Mathis

[57] ABSTRACT

A device for optically coupling an optical fiber (1) forming part of an optical communication system, to an optical semiconductor laser amplifier (4) having an input facet (5) and an output facet (7). The optical fiber has an end surface (2) arranged opposite to at least one of the facets. A characteristic feature of the invention is an diffraction optics element (11) arranged between the end surface of the fiber and the surface of the facet in order to adapt the nearfield of the fiber end to the nearfield of the facet surface and for providing optical filtering reducing spontaneous emission noise. Preferably the diffraction optics element is a phase hologram.

5 Claims, 3 Drawing Sheets

DIFFRACTION OPTICAL COUPLER

FIELD OF THE INVENTION

The present invention relates to an optical coupling device for coupling an optical fiber of an optical communication system to an optical semiconductor amplifier having an input and an output facet. The optical fiber has an end surface provided opposite to at least one of the facets.

DESCRIPTION OF RELATED ART

Optical coupling devices of the kind referred to above have a fair efficiency and a high noise figure. Attempts have been made in order to improve the fair efficiency of the coupling between the end of the fiber and the facet of the semiconductor laser amplifier by melting the end of the optical fiber into the form of a lens focusing the light onto the facet. In spite of this the losses of this known optical coupling device is typically in the order of 5 dB. To compensate for said losses the amplification of the semiconductor laser amplifier must be increased. This means that for a predetermined, desired fiber-semiconductor laser amplifier-fiber-amplification the amplification of the semiconductor laser amplifier must be increased. This, however, will increase the so called amplification ripple. Amplification ripple manifests itself as non-desired amplification fluctuations. The amplification fluctuations should be less than 3 dB. Should the fiber-semiconductor laser amplifier-fiber-amplification be e.g. 26 dB it is therefore in practice required that the so called modal reflectance of the semiconductor laser amplifier is less than $4 \times 10^{-5}$ which only can be achieved if extensive technological measures are taken. It is also difficult to reproduce the results with a reasonable economic investment. Altogether this implies that the desired high amplification must be reduced.

This high, non-desired, noise figure of the known optical coupling device depends on spontaneous emission noise from light of all wavelengths within the wavelengths range transmitted by the coupling device, i.e. light of all frequencies within the complete gain characteristic of the semiconductor laser amplifier. Typically this gain characteristic extends over 40 nm.

SUMMARY OF THE INVENTION

An object of the present invention is to provide an optical coupling device having enhanced coupling efficiency while simulataneously its noise figure is reduced. The losses of the optical coupling device should be in the order of 1 dB and less.

Another object of the present invention is to provide a simple enclosure for an optical amplifier, particularly a laser amplifier, said enclosure also including a small number of components. The less the number of components that are present within the enclosure the simpler will be the alignment, i.e. the line up, of the components within the enclosure. This follows from the fact that the accuracy during line up should be better than 1μm.

Still another object with the invention is to image the wavefront that propagates from one end of the fiber optics element onto one end of the active region of the semiconductor laser amplifier. In accordance with the invention this is achieved by using a wavelength dependence diffraction optics element, preferably a phase hologram which at the same time works as a narrow-band optical filter.

Another object of the present invention is to image the wavefront which propagates from a second end surface of the active region of the semiconductor laser amplifier onto the end surface of an optical fiber by using a diffraction optics element, preferably a phase hologram.

BRIEF DESCRIPTION OF THE DRAWINGS

Various embodiments of the invention will be described below with reference to the accompanying drawings wherein.

DESCRIPTION OF A PREFERRED EMBODIMENT

Figure 1:
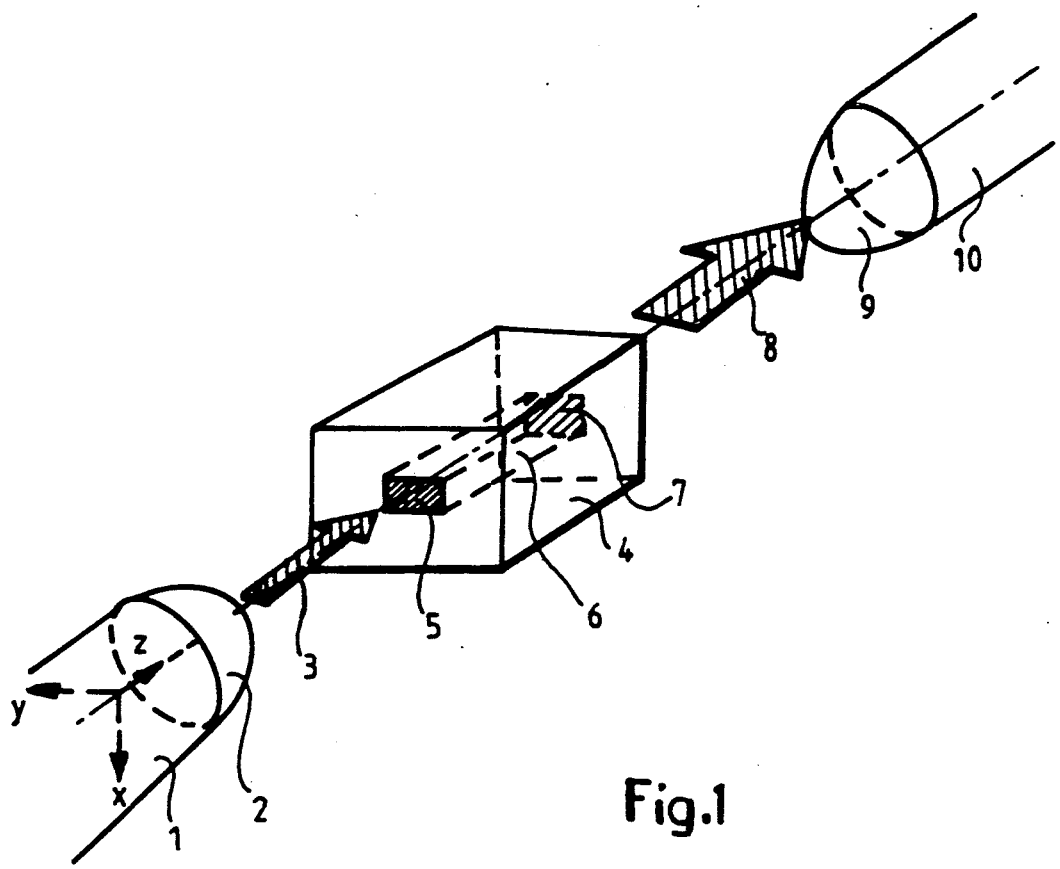
FIG. 1 is a perspective view of a known art optical coupling device.

In FIG. 1 there is shown a conventional optical coupling device for an optical fiber 1 having a melt end surface 2 commonly referred to as a taper. Light propagating through the optical fiber and schematically shown at arrow 3 is directed by the end surface 2, working as a lens, to a schematically shown semiconductor laser amplifier 4, more particularly to an active region 6 of one end surface 5 of the semiconductor laser amplifier. The semiconductor laser amplifier amplifies the light and amplified light leaves the active region through its opposite end surface 7. Amplified light, schematically shown at arrow 8, strikes a second melt end surface 9, also referred to as taper 2, of an output optical fiber 10. End surfaces 5, 7 are commonly referred to as facets.

The coupling efficiency of this previously known coupling device is improved in accordance with the present invention by adapting the nearfield of each taper 2, 9 to the nearfield of each end surface 5 and 7 respectively of the active region.

The term nearfield as used herein refers to the power distribution of light in planes which are perpendicular to the propagation direction of light and which are situated in the nearfield of the end surface in question.

Figure 3A:
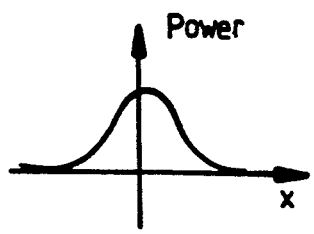
FIGS. 3A–C are diagrams showing the nearfield at the end surface of an optical fiber.
Figure 3B:
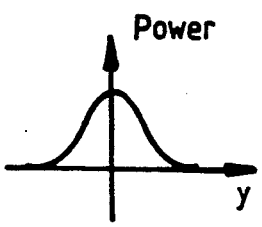
Figure 3C:
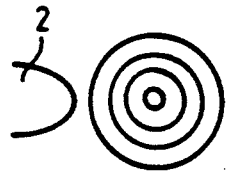

The nearfield of a taper and the nearfield of an end surface of the active region are not equal neither as regards to extension or to symmetry. This has been illustrated in FIGS. 3A–C and 4A–C. FIG. 3 is illustrating the nearfield of a taper. FIG. 3A is illustrating the power distribution of the electromagnetic wave along the x-direction and FIG. 3B the power distribution along the y-direction of an electromagnetic wave propagating in the z-direction. The directions referred to above correspond to the directions of the x-y-z-coordinate system shown schematically in FIG. 1. As appears from FIGS. 3A and 3B the two curves are rising and descending with the same inclination and an imaginary image of the power distribution in a plane perpendicular to the propagation direction of the wave has the appearance shown in FIG. 3C.

Figure 4A:
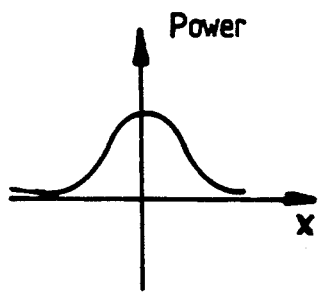
FIGS. 4A–C are diagrams showing the nearfield at the end surface of the active region of a semiconductor laser amplifier.
Figure 4B:
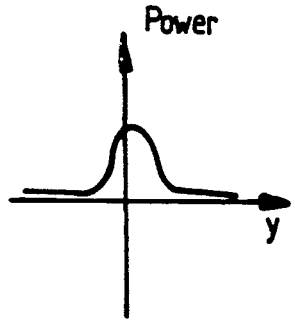
Figure 4C:

A corresponding imaginary image of the nearfield of any of the end surfaces 5, 7 is shown in FIGS. 4A–C. The curve shown in FIG. 4A is rising and falling with less inclination than the curve of FIG. 4B, this resulting in a power distribution, in a plane perpendicular to the propagation direction of the wave, having the appearance shown in FIG. 4C.

Accordingly, if the nearfield shown in FIG. 3C is reproduced or imaged on the nearfield shown in FIG. 4 the two nearfields will not completely overlap each other, this reducing the coupling efficiency.

Figure 2:
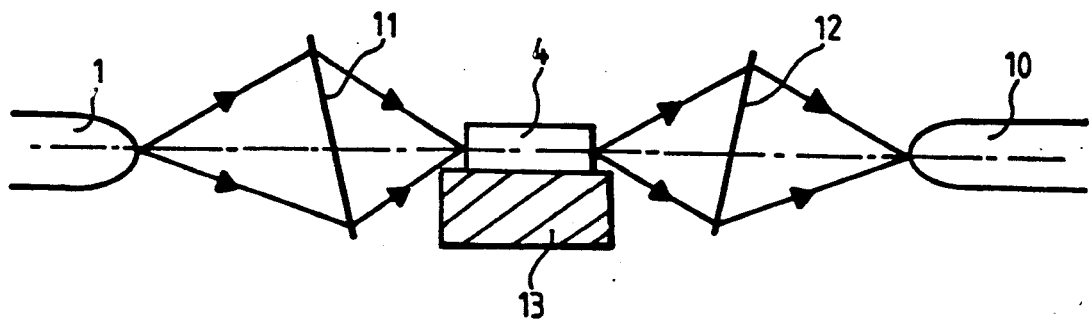
FIG. 2 illustrates an optical coupling device in accordance with the present invention.

In FIG. 2 an optical coupling device in accordance with the present invention is shown in a side view. Elements corresponding to each other in FIGS. 1 and 2 are indicated with the same reference designations. In accordance with the present invention a diffraction optics element 11 and 12 is each provided between end surfaces 2, 5 and 7, 9 respectively. Each diffraction optics element is preferably a phase hologram, a kinoform or any wavefront-reconstructing device. The diffraction optics element has a transfer function that adapts the nearfield of the end of the optical fiber to the nearfield of the end surface of the semiconductor laser amplifier. The transfer function is a mathematical expression known to the man skilled in the art and will therefore not be described in detail here. It is a simple matter to manufacture computer generated holograms having the described transfer function. Once the original has been produced copies of the original can be produced at a low price. The desired transfer function is impressed in the diffraction optics element in the form of grooves or impressions of varying form, depth and density. Usally the diffraction optics element is a film or plate of optically transparent material such as glass or plastics.

In FIG. 2 it is shown that the optical coupling device in accordance with the present invention comprises a metal member 13 on which the semiconductor laser amplifier is mounted in such manner that heat generated in the amplifier is conducted to the metal member. In this manner the metal member works as a heat sink for the semiconductor laser amplifier. From FIG. 2 it is also apparent that the diffraction optics elements 11, 12 each are oblique relative to the optical axis of the coupling device in order to prevent non-desired reflection. Such non-desired reflection can take place if light emitted from the semiconductor laser amplifier 4 is reflected back into the amplifier.

Figure 5:
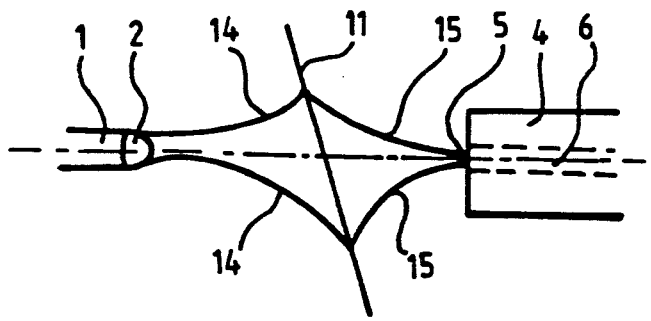
FIG. 5 illustrates the adaption of the nearfield at the end of an optical fiber to the nearfield of one end surface of the semiconductor laser amplifier.

FIG. 5 is schematically illustrating how the nearfield of an optic fiber taper has been adapted to the nearfield of an end surface of the semiconductor laser amplifier with the aid of a diffraction optics element 11 in accordance with the invention. Solid lines 14 represent the propagation of the electromagntic wave in the z-direction, i.e. in the propagation direction of the wave, while reference designation 15 refers to the propagation direction of the wave after its passage through the defraction optics element 11.

Figure 6:
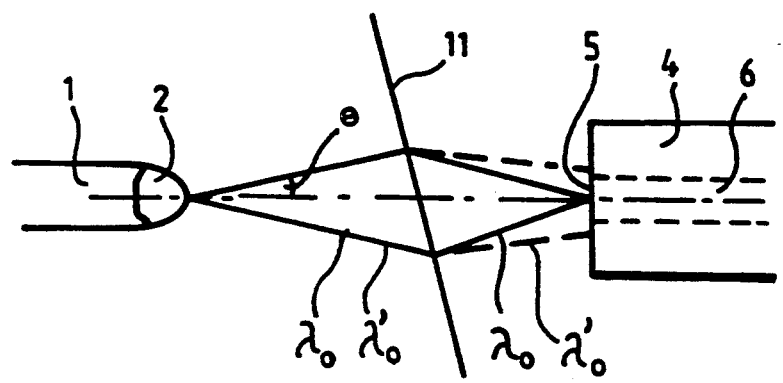
FIG. 6 is schematically illustrating the underlying principles of the band pass characteristic of the defraction opticts element and FIG. 7 is a curve of the coupling efficiency of the optical coupling device in accordance with the present invention.

In FIG. 6 the influence of the diffraction optics element 11 on the angle of refraction of a light beam relative to the optical axis of the system is shown. From Bragg's relation:

$$2d \sin \phi = \lambda$$

where $d^{-1}$ = the frequence of the diffraction optics element, i.e. the distance between two adjacent grooves or the distance between two maxima of refraction index, $\phi$ = the direction of the beam relative to the optical axis and $\lambda$ = wavelength it follows that incident light of different wavelengths $\lambda\cdot$, $\lambda\cdot'$ are refracted differently. In accordance with the present invention this is used to an advantage. Light of predetermined wavelengths will thus have a reduced coupling efficiency upon entrance into the end surface 5 of the semiconductor laser amplifier. This is illustrated at broken lines 16 in FIG. 6. Therefore, by properly selecting the frequency of the grooves the diffraction optics element will work as a band pass filter for the light. The advantage achieved in doing so is that spontaneous emission noise will come from light of wavelengths falling within the pass band of the filter and not, as is the case with the known construction, from light of wavelengths falling within the complete wavelength range of the amplification spectrum of the laser amplifier. Thus by proper selection of said frequency of the diffraction optics element the bandwidth can be restricted, for example to ±5 nm, around a centre wave length $\lambda\cdot$. This has been illustrated in FIG. 7.

Figure 7:
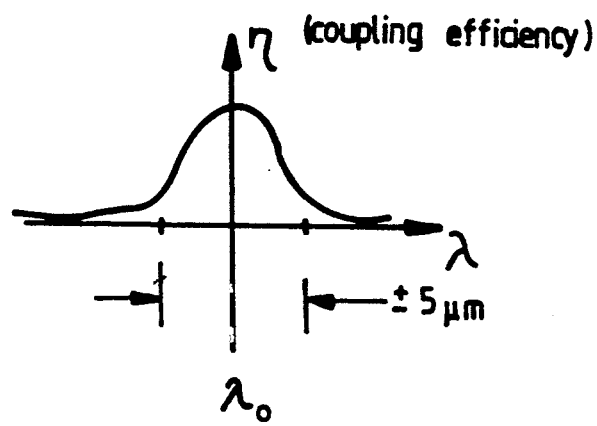

In FIG. 7 the coupling efficiency as a function of the wavelength around a center wavelength $\lambda\cdot$ is shown. Should the wavelength filtering effect referred to above be absent, then the bandwidth would normally be in the order of 40 nm.

An enclosure in accordance with the invention comprises, further to the laser amplifier 4, the two diffraction optics elements 11, 12 and the optic fibers 1, 10. If desired the enclosure may also comprise the metal member 11.

The invention may be modified and varied in many ways within the scope of the appending claims.

I claim:

1. An optical coupling device in an optical communication system, comprising:

a first optical fiber having an end surface;

an optical amplifier having an input and an output; and a first diffraction optics element for coupling light from the amplifier output to the first optic fiber; wherein the first diffraction optics element is capable of coupling the amplified light from an output facet which forms the output of said optical amplifier to the end surface of the first optical fiber;

has a transfer function selected such that the power distribution of the light in a plane perpendicular to the propagation direction of the light in a nearfield of the end surface of the first optical fiber is adapted to the power distribution of light in a plane perpendicular to the propagation direction of the light in a nearfield of the output facet of the amplifier; and has a frequency selected such that the first diffraction optics element functions as an optical bandpass filter for limiting the bandwidth of the amplified light as a result of spontaneous emission in the optical amplifier.

2. An optical coupling device according to claim 1, further comprising:

a second optical fiber having an end surface; and a second diffraction optics element for coupling the light from the second optical fiber to the amplifier input; wherein the second diffraction optics element is capable of coupling light from the end surface of the second optical fiber to an input facet which forms the input of the optical amplifier;

has a transfer function selected such that the power distribution of the light in a plane perpendicular to the propagation direction of the light in a nearfield of the end surface of the second fiber is adapted to the power distribution of the light in a plane perpendicular to the propagation direction of the light in a nearfield of the input facet of the amplifier; and has a frequency selected such that the second diffraction optics element also functions as an optical bandpass filter for limiting the bandwidth of light exiting from the amplifier.

3. An optical coupling device according to claim 1, wherein each of the first and the second diffraction optics elements includes one of the following: a hologram, a kinofilm and a wavefront-transforming device.

4. An optical coupling device according to claim 2, wherein each of the first and the second diffraction optics elements is a planar element, and the plane of respective elements is inclined in relation to the optical axis of the coupling device.

5. An optical coupling device according to claim 4, wherein the device is encapsulated.

* * * * *